Figure 2:
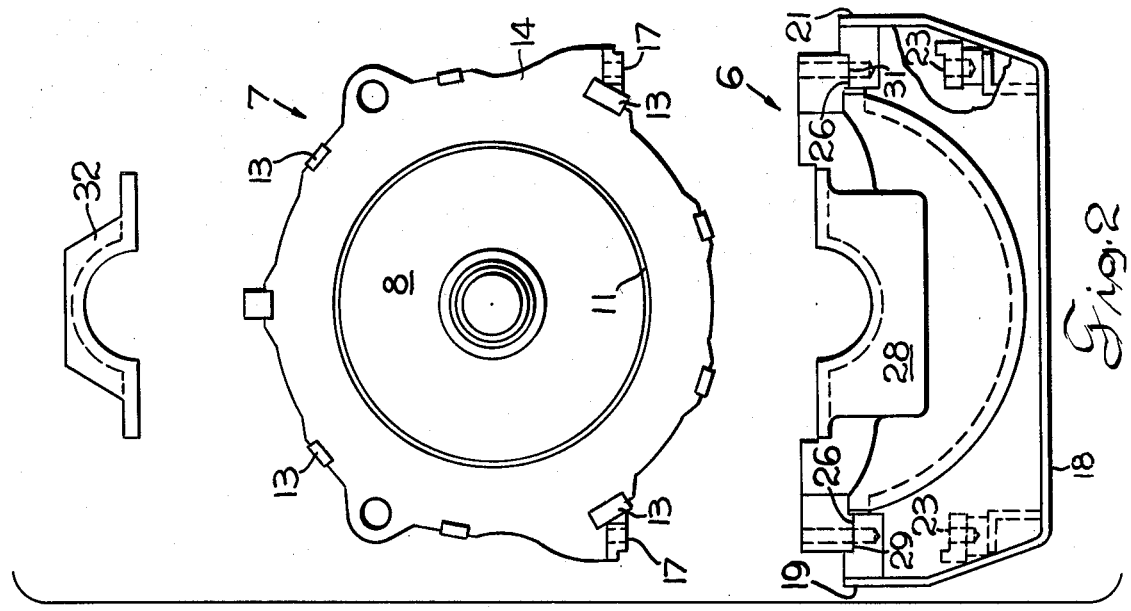

United States Patent [19]

Bartheld et al.

[11] 4,216,399
[45] Aug. 5, 1980

[54] DYNAMOELECTRIC MACHINE SUPPORT FRAME

[75] Inventors: Robert G. Bartheld; Paul Diamant, both of Cincinnati, Ohio

[73] Assignee: Siemens-Allis, Inc., Atlanta, Ga.

[21] Appl. No.: 935,170

[22] Filed: Aug. 21, 1978

Related U.S. Application Data

[63] Continuation of Ser. No. 768,687, Feb. 14, 1977, abandoned, which is a continuation of Ser. No. 595,630, Jul. 14, 1975, abandoned.

[51] Int. Cl.² .............................................. H02K 5/00
[52] U.S. Cl. ...................................... 310/91; 310/89; 310/90
[58] Field of Search ................... 310/42, 91, 89, 90, 310/85, 254, 258; 248/671

[56] References Cited

U.S. PATENT DOCUMENTS

| | | | |
|---|---|---|---|
| 1,689,503 | 10/1928 | Savage | 310/258 |
| 2,970,236 | 1/1961 | DePaul | 310/91 |
| 3,064,152 | 11/1962 | DePaul | 310/254 |
| 3,110,832 | 11/1963 | Worthington | 310/254 |
| 3,538,598 | 11/1970 | Wightman | 310/42 |
| 3,544,823 | 12/1970 | Chigrinsky | 310/89 |

Primary Examiner—R. Skudy
Attorney, Agent, or Firm—Frederick W. Powers, III

[57] ABSTRACT

A dynamoelectric machine support frame wherein the stator mounting surfaces and the rotor bearing bracket mounting surfaces are all horizontally disposed in parallel planes. Further, in the preferred embodiment, all mounting surfaces on one lateral side of the frame are axially aligned with one another.

1 Claim, 2 Drawing Figures

U.S. Patent

Aug. 5, 1980

4,216,399

DYNAMOELECTRIC MACHINE SUPPORT FRAME

This is a continuation of application Ser. No. 768,687, filed Feb. 14, 1977, now abandoned, which was a continuation of parent application Ser. No. 595,630 filed July 14, 1975, now abandoned.

This invention relates generally to dynamoelectric machines and more specifically to the construction of large electric motors and generators.

In the past, the cost of manufacturing large dynamoelectric machines was extremely high because of the difficulty in assembling the stator and the rotor of the machine with an accurate air gap. Expensive and time consuming machining and assembly were required on the large stator supports and other members to properly align the motor rotor and the stator. In addition, the machines frequently had to be disassembled and adjusted to retain the desired air gap.

To overcome this, machines have been designed which provide a standard type of base having mounting means connected thereto which are accurately located relative to one another so as to accurately position the rotor and stator of the machine. Examples of such prior art are U.S. Pat. No. 2,274,351 issued to A. P. Wood, Feb. 24, 1942; U.S. Pat. No. 3,064,152 issued to A. S. DePaul et al, Nov. 13, 1962; and U.S. Pat. No. 3,375,382 issued to R. H. Barber et al, Mar. 26, 1968. While these prior art patents did provide improvements over the then known prior art, the invention of this patent takes an additional step by locating all mounting surfaces in horizontally disposed parallel planes and in the preferred embodiment axially aligned to simplify the machining process.

It is, therefore, the purpose and general object of this invention to provide an improved construction of a dynamoelectric machine.

Another object of this invention is to provide a support frame for large dynamoelectric machines in which the air gap alignment can be easily and accurately formed prior to assembly so that no adjustments are required during and after assembly.

A further object of this invention is to provide a support frame for a dynamoelectric machine of the hereinbefore described type wherein all mounting surfaces are horizontally disposed and are located in parallel planes.

A more specific object of this invention is to provide a support frame for a dynamoelectric machine of the hereinbefore described type wherein all mounting surfaces on each lateral side of the support frame are axially aligned.

Figure 1:
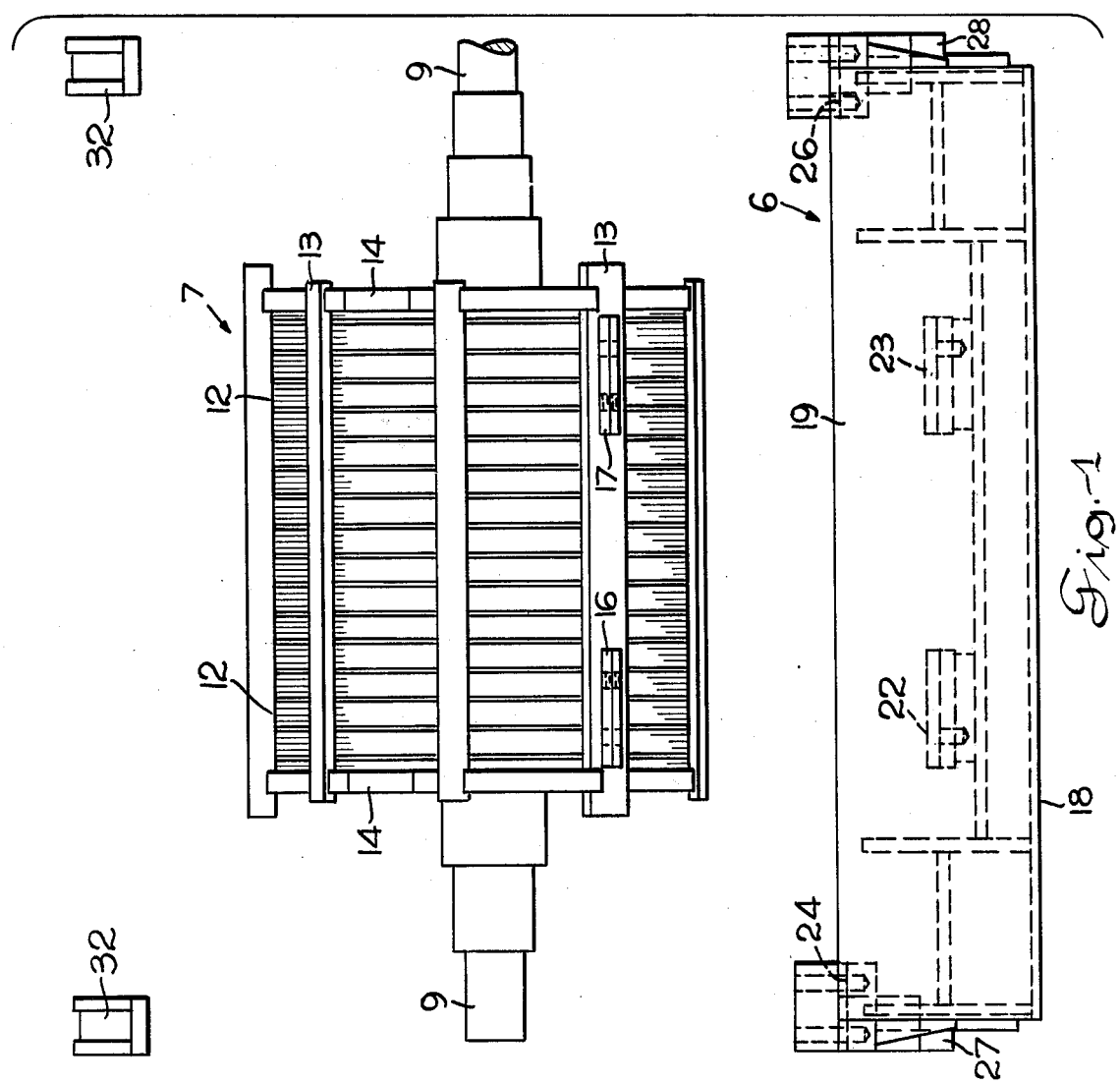

These and other objects of the subject invention will become more fully apparent when the following description is read in light of the attached drawings wherein:

FIG. 1 is an exploded side view of a dynamoelectric machine constructed in accordance with this invention; and FIG. 2 is an exploded front view of FIG. 1.

Referring to the drawings in more detail, the invention is illustrated in a large electric motor. The motor is made up generally of a base member 6, a stator 7 and a rotor 8. The rotor 8 is constructed of any conventional type and is provided with oppositely extending shaft ends 9. The rotor is constructed for positioning within the stator bore and for rotation therein with a predetermined uniform air gap 11.

The stator 7 is constructed of a plurality of annular steel laminations 12 stacked and clamped together in the conventional manner such as by axially extending bars 13 and end plates 14 to form the stator core having a cylindrical bore within which the rotor 8 rotates. The preferred form of stator is provided with two sets 16 and 17 of mounting pads. These mounting pads are accurately macined and located relative to one another and the center of the cylindrical bore of the stator.

In the preferred embodiment shown herein for purposes of illustration, the base member is constructed of a bottom plate 18 and two laterally spaced upstanding side walls 19 and 21. A first and second pair of stator mounting surfaces 22 and 23 are rigidly connected to the base member. All points on all of the stator mounting surfaces 22 and 23 lie in a common horizontally disposed plane. Furthermore, the stator mounting surfaces on each lateral side of the base member 6 are axially aligned.

The base member 6 is also provided with a first and second pair of axially spaced rotor bearing bracket mounting surfaces 24 and 26. The stator mounting surfaces are located intermediate the bearing bracket mounting surfaces. All points on all of the rotor bearing bracket mounting surfaces lie in a common horizontal plane which is parallel to the plane of the stator mounting surfaces. Furthermore, the rotor bracket mounting surfaces on each lateral side of the base member are also axially aligned. In the preferred embodiment shown herein, the rotor bearing bracket mounting surfaces and the stator mounting surfaces on each lateral side of the base member are also axially aligned.

A rotor bearing bracket is provided at each end of the base member 6. Each rotor bearing bracket is composed of a lower portion 27 and 28 having spaced mounting surfaces 29 and 31 which are accurately machined and located relative to the centerline of the bearing bracket. Aligned bolt holes are provided through the bearing brackets and into the bearing bracket supports 24 and 26. A bearing bracket cap 32 having a complementary half shaft opening therethrough is constructed for attachment to each lower bracket mounting surface 24 and 26 in any conventional manner such as by bolts (not shown).

In order to insure proper air gap 11 between the rotor 8 and stator 7, the mounting surfaces on the base member 6 must be accurately located. To this end, the base member is located on a milling machine and since each of the stator mounting surfaces are in a common plane, all four of these surfaces 22 and 23 can be accurately machined by merely changing the lateral setting of the milling head. The same is true of the bearing bracket mounting surfaces since they also are in a common plane. Additionally, as shown herein the preferred embodiment has all mounting surfaces both for the stator and the bearing bracket on each lateral side of the base member axially aligned. Therefore, all of these mounting surfaces can be machined by merely changing the height of the milling cutter but without requiring a separate setting to locate these surfaces relative to the centerline of the base member. With this arrangement, a very accurate alignment can be obtained between both the stator mounting surfaces and the bearing bracket mounting surfaces. It is then possible to accurately machine the mounting surfaces of the lower bearing bracket half 28 and the stator mounting pads 16 and 17 each relative to their own centerline. With this arrangement, a uniform air gap can be obtained without extensive adjustment during assembly.

The embodiments of the invention in which an exclusive property or privilege is claimed are defined as follows:

1. In a dynamoelectric machine having a stator (7) with spaced mounting pads (16, 17) provided with downwardly facing horizontal support surfaces and a rotor supported in bearings mounted in brackets (27, 28) for rotation therein about a horizontal axis with a predetermined uniform air gap (11) between said rotor and stator, said brackets having spaced planar downwardly facing horizontal support surfaces, a frame for supporting said stator and rotor comprising: an elongated horizontal base plate member (18) extending parallel to said axis of said rotor and having laterally spaced upstanding side walls (19, 21) on opposite sides of said rotor, said frame having a first pair (24) and a second pair (26) of planar, horizontal rotor bearing bracket mounting surfaces adjacent opposite ends of said base plate having all points thereon in a common horizontal plans, said planar bearing bracket mounting surfaces of each said pair being laterally spaced on opposite sides of said rotor axis and being adapted to engage said planar support surfaces on one of said brackets, said frame also having portions rigidly connected to the interior facing sides of said side walls providing a first pair (22) and a second pair (23) of planar horizontal stator mounting surfaces spaced apart longitudinally of said base plate member and disposed intermediate said first and second pair of rotor bearing bracket mounting surfaces and having all points thereon in a common horizontal plane and being adapted to directly engage said planar support surfaces on said stator mounting pads, all said rotor bearing bracket mounting surfaces and stator mounting surfaces on the same lateral side of said base plate member being axially aligned with one another in a direction parallel to said rotor axis.

* * * * *